United States Patent [19]

Berry et al.

[11] Patent Number: 5,193,942
[45] Date of Patent: Mar. 16, 1993

[54] METHOD AND APPARATUS FOR TRANSPORTING LIQUID SLURRIES

[75] Inventors: Gregory F. Berry, Naperville; Robert W. Lyczkowski, Darien; Chi-Sheng Wang, Woodridge, all of Ill.

[73] Assignee: The United States of America as represented by the United States Department of Energy, Washington, D.C.

[21] Appl. No.: 642,270

[22] Filed: Jan. 16, 1991

[51] Int. Cl.⁵ ............................................. B65G 53/04
[52] U.S. Cl. .................................. 406/47; 406/46; 406/48; 406/197
[58] Field of Search ............... 406/47, 48, 92, 46, 406/193, 194, 93–95, 197, 153

[56] References Cited

U.S. PATENT DOCUMENTS

| | | |
|---|---|---|
| 584,968 | 6/1897 | Taylor . |
| 628,187 | 7/1899 | Sibley . |
| 1,243,893 | 10/1917 | Strong . |
| 1,246,189 | 11/1917 | Vanderlip . |
| 1,272,794 | 7/1918 | Girtanner . |
| 1,311,297 | 7/1919 | Strong . |
| 1,314,699 | 9/1919 | Poppenhusen . |
| 2,046,434 | 7/1936 | Touhey ............................ 406/47 |
| 2,350,759 | 6/1944 | Hilmer et al. . |
| 2,578,003 | 12/1951 | Garbo . |
| 2,794,686 | 6/1957 | Anselman et al. ................. 406/92 X |
| 3,040,760 | 6/1962 | Macks ........................... 406/46 X |
| 3,149,885 | 9/1964 | Walsh . |
| 3,276,821 | 10/1966 | Edwards ........................ 406/193 |
| 3,886,972 | 6/1975 | Scott et al. ..................... 406/92 X |
| 3,948,565 | 4/1976 | Horvath ......................... 406/47 |
| 4,372,712 | 2/1983 | Powell et al. . |
| 4,413,932 | 11/1983 | Kobak . |
| 4,684,296 | 8/1987 | Horii et al. ..................... 406/92 X |

FOREIGN PATENT DOCUMENTS

| | | | |
|---|---|---|---|
| 7002123 | 8/1970 | Netherlands ........................ 406/46 |
| 1075012 | 2/1984 | U.S.S.R. ........................... 406/46 |
| 1134496 | 1/1985 | U.S.S.R. ........................... 406/47 |
| 1207946 | 1/1986 | U.S.S.R. ........................... 406/92 |
| 1393729 | 5/1988 | U.S.S.R. ........................... 406/193 |
| 1168608 | 10/1969 | United Kingdom ................ 406/194 |

Primary Examiner—Charles A. Marmor
Assistant Examiner—James M. Kannofsky
Attorney, Agent, or Firm—Hugh W. Glenn; Robert J. Fisher; William R. Moser

[57] ABSTRACT

An improved method and device to prevent erosion of slurry transport devices is disclosed which uses liquid injection to prevent contact by the slurry composition with the inner surface of the walls of the transport system. A non-abrasive liquid is injected into the slurry transport system and maintains intimate contact with the entire inner surface of the transport system, thereby creating a fluid barrier between the non-abrasive liquid and the inner surface of the transport system which thereby prevents erosion.

10 Claims, 3 Drawing Sheets

METHOD AND APPARATUS FOR TRANSPORTING LIQUID SLURRIES

CONTRACTUAL ORIGIN OF THE INVENTION

The United States Government has rights in this invention pursuant to Contract No. W-31-109-ENG-38 between the U.S. Department of Energy and University of Chicago.

BACKGROUND OF THE INVENTION

The present invention relates generally to a method of reducing erosion caused by slurries flowing through transport devices and more particularly to a method of injecting a liquid along the inner surface of a conveying apparatus or spray nozzle to reduce the erosion thereof.

Erosion of piping systems and other known conveying apparatus for slurries is a known problem in the art. However, slurries are increasingly used today to transport and process numerous abrasive solids such as ash, sand, coal and other minerals. Slurry pipelines are being seriously proposed as being an economically advantageous alternative to transporting coal by rail. Slurries are also being prepared for coal liquefiction and as novel fuels for engines. However, the erosion of the slurry pipelines and components is a serious problem which normally results in the premature failure of the pipeline thereby negatively effecting the economics involved in implementing slurries for such new useful purposes.

Erosion or scouring normally occurs when the abrasive slurry particles interact through impaction with the inner pipeline walls. Attempts at solving this known problem have included the use of pipelines constructed of tungsten carbide and other more resistive materials. However, such attempts have not solved the problem because these strong materials are also known to erode over time. Additionally, the use of a thicker piping section or harder materials does not necessarily solve the problem since certain piping sections such as elbows and nozzles require the maintenance of the inside surface of the piping section in order to maintain the proper performance of that particular section. Other early attempts at solving the problem such as those disclosed in U.S. Pat. No. 584,968, Taylor or U.S. Pat. No. 3,149,885, Walsh also fall short of a complete solution. Taylor teaches a method of injecting a stream of water through a single inlet placed at an acute angle to a bend in an attempt to prevent contact of abrasive particles with the upper portion of the bend. Walsh teaches a method for injecting air into the bent portion of tubing for the same purpose. Both inventions are limited in their disclosures to preventing erosion in bent sections of tubing in which only a single wall is protected against the abrasive effects of the solid materials being conveyed therethrough.

Therefore, there is a need for a method and apparatus which prevents the erosion of the entire inner surface area of a pipeline or similar conveying system and which also may be employed to prevent erosion in spray nozzles, manifolds, jet pumps, and other devices commonly used in slurry transport systems.

SUMMARY OF THE INVENTION

It is therefore an object of the present invention to provide a method for the prevention of erosion in a slurry transport system.

It is a further object of the present invention to provide a method by which all of the parts of a slurry transport system will be protected from erosion.

It is a further object of the present invention to provide a method for the prevention of erosion in a slurry transport system which method is economically feasible and simple to implement.

In accordance with this invention, there is provided a slurry transport system comprising straight and bent sections of tubing and which may also comprise manifolds and spray nozzles. Injected through the walls of the slurry transport system is a non-abrasive fluid, such as water. The introduction of this non-abrasive fluid is made at various distances along the transport system in the direction of the flow of the slurry, upstream of high-wear areas. The inlets through which this non-abrasive fluid is injected, direct the non-abrasive fluid along the entire inner surface of the transport system. Thus the non-abrasive fluid which flows along the entire inner surface of the transport system provides a liquid film which serves as a fluid barrier between the inner walls of the transport system and the erosive particles of the slurry. The non-abrasive fluid may be the same as that which forms the slurry, or may be a different fluid which would not substantially alter the combustion and/or transport characteristics of the slurry. The mass flow rate of the injected non-abrasive fluid and the film thickness thereof will be controlled in order to keep the slurry particles from reaching the wall. The mass flow rate depends on the characteristics of the primary slurry flow.

The foregoing and other objects, features and advantages of the invention will be apparent from the following more particular description of the embodiments of the invention as illustrated in the accompanying drawings.

BRIEF DESCRIPTION OF THE DRAWINGS

The present invention is illustrated in the accompanying drawings wherein.

DETAILED DESCRIPTION OF THE PREFERRED EMBODIMENT

Figure 1:
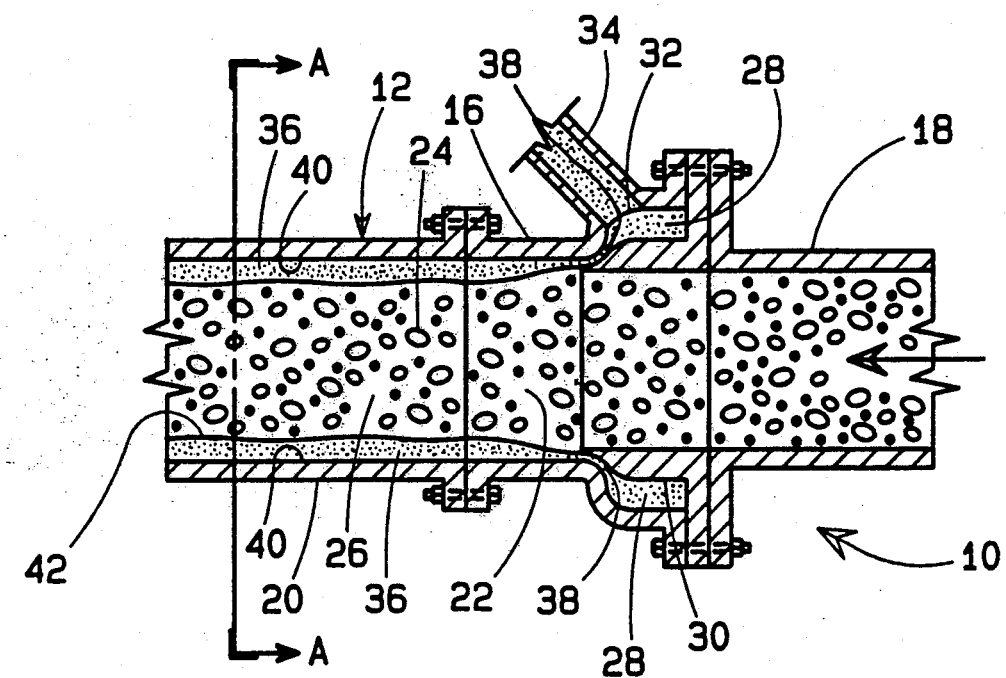
FIG. 1 is a vertical longitudinal sectional view of a straight portion of a slurry transport system.
Figure 2:
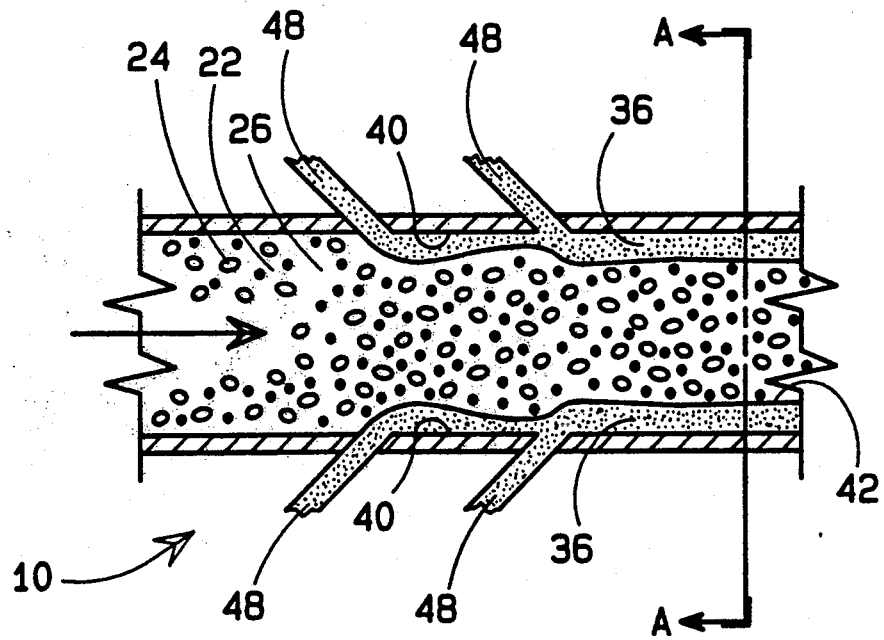
FIG. 2 is a vertical longitudinal sectional view of a straight portion of a slurry transport system illustrating an alternate embodiment.
Figure 3:
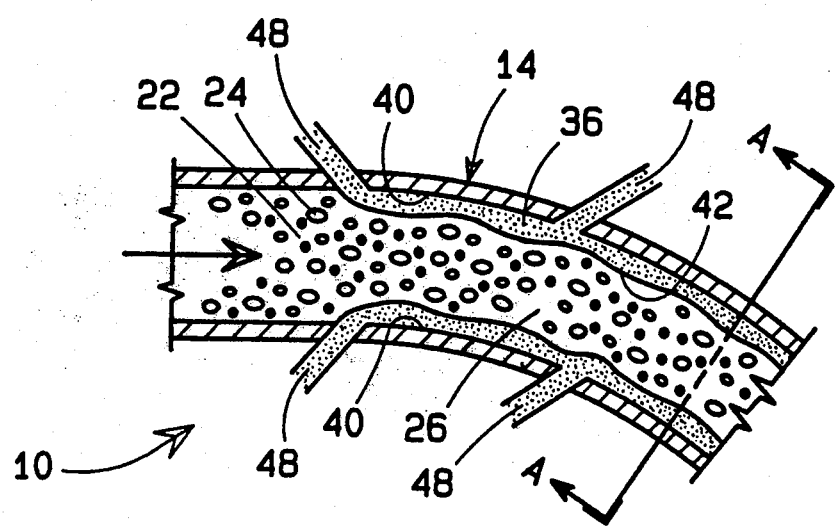
FIG. 3 is a vertical longitudinal sectional view of a bent portion of a slurry transport system.

As illustrated in FIGS. 1, 2 and 3, the transport system 10 of the present invention is comprised primarily of straight sections of tubing 12 and bent sections of tubing 14. As best illustrated in FIG. 1, an annulus is coupled between a first straight section of tubing 18 and second straight section of tubing 20. The slurry composition 22 flows through the first 18 and second 20 straight sections of tubing and annulus 16 in the direction of the arrow. The slurry composition 22 is comprised of abrasive solid particles 24 which are entrained in a liquid substance 26. It is anticipated that the solid particles 24 which comprise the slurry composition 22 can be coal, ash, sand, or numerous types of minerals.

The annulus 16 is primarily cylindrical in shape having a small chamber 28 which encircles an inner sleeve portion 30. The annulus 16 is also provided with an inlet 32 to which a supply line 34 may be connected.

In the preferred embodiment, a non-abrasive liquid 36 is supplied through supply line 34 and into the inlet 32 of annulus 16 such that a continuous flow of non-abrasive liquid 36 is forced through the chamber 28 of annulus 16. The annulus 16 is formed such that there is a small opening 38 between the chamber 28 and inner sleeve portion 30. The small opening 38 encircles the entire annulus 16 and allows an annular flow of non-abrasive liquid 36 to flow out into the second straight section of tubing 20 and thereafter the entire transport system 10. The continuous flow of the non-abrasive liquid 36 together with the flow of the slurry composition 22 coupled with the non-abrasive liquid 36 being directed into the transport system 10 by annulus 16 allows the non-abrasive liquid 36 to maintain intimate contact with the entire inner surface 40 of the transport system 10. The non-abrasive liquid 3 thereby effectively prevents contact by the slurry composition 22 with the inner surface 40 of the transport system 10. Since erosion in slurry transport system occurs due to the solid particles 24 impacting against the inner surface 40 of transport system 10, the fluid barrier of the non-abrasive liquid 36 which maintains intimate contact with the inner surface 40 of the transport system 10 prevents, or considerably slows down the erosion process.

As can be seen from the drawings and the descriptions thereof, the methods of the present invention significantly improve upon known methods for the prevention of erosion. It is almost without exception that known methods of minimizing erosion in slurry transport systems use momentum or force to disrupt and deflect the flow of slurry compositions within the transport systems. The method of the present invention, however, does not use momentum or force to disrupt or deflect the flow of the slurry composition 22, but rather creates a controlled barrier of fluid to coat the entire inner surface 40 of the transport system 10. The slurry composition 22 is therefore prevented from coming into contact with the inner surface 40 of transport system 10 by frictional considerations.

The non-abrasive liquid 36 which is used in the present invention may be the same as the liquid substance 26 which comprises the slurry composition, or it may be a different liquid altogether so long as it does not substantially alter the combustion and/or transport characteristics of the slurry composition 22. Accordingly, the non-abrasive liquid 36 may be water, or any other non-abrasive, inorganic or organic fluid that is compatible with the system.

As previously described, a film layer 42 of non-abrasive liquid 36 is maintained around the entire inner surface 40 of transport system 10. The film layer 42 flows continuously due to the constant injection of non-abrasive substance 36 into annulus 16 through inlet 32. It is critical that the mass flow rate of the non-abrasive liquid 36 and the thickness of the film layer 42 created thereby, be controlled in order to keep the solid particles 24 of the slurry composition 22 from reaching the inner surface 40 of transport system 10. The mass flow rate of the non-abrasive liquid 36 will depend on the physical characteristics of the flow of the slurry composition 22. There are several important parameters which affect the mass flow rate of the slurry composition 22. Among these are the concentration of solid particles 24 within the slurry composition 22, the components which comprise the transport system 10, as well as how the above various components are configured. The connection of solid particles 24 within the slurry composition 22 may be measured using commonly known turbidimeters which indicate the concentration of solid particles either on an alpha numeric display and/or electronic signal. Similarly, the flow rate of the liquid, which is obviously controlled by the pumps in the system, can also be measured at various points in the system using conventional commonly known flow meters. Again, the flow rate can then be displayed visually or indicated by an electronic signal. The components may include straight sections of tubing 12, bent sections of tubing 14, jet pumps 44, atomizer spray nozzles 46, manifolds (not shown), as well as various other components used in slurry transport systems.

Accordingly, the thickness of the film layer 42 cannot be constant, but rather needs to be controlled depending on the configuration of transport system 10 and the type of slurry composition 22 being conveyed therethrough. Control of the thickness of film layer 42 may be affected by control valves which are either manually or computer operated to alter the rate at which the non-abrasive liquid 36 enters the transport system 10. The turbidity of the slurry and the flow rate can be directly controlled by the above listed turbidimeters and flow meters directly into computer controlled valves, if desired. Depending on the length of the transport system 10, a number of annulus 16 will be placed at various distances therealong in order to help maintain a constant film layer 42 of non-abrasive liquid 36. Accordingly, there will be a number of inlets 32 through which non-abrasive liquid 36 will flow. Because of this placement of inlets 32, it is understood that the flow rate of non-abrasive liquid 36 will be different at various locations along the transport system 10. For example, the flow rate of non-abrasive liquid 36 through straight sections of tubing 12 may be greater or less than that near bent sections of tubing 14. As such, control means such as control valves are needed not just at the primary injection point, but at various locations along transport system 10.

Due to various configurations of a transport system 10, the flow rate of slurry composition 22 will vary at different points along transport system 10. The flow rate of the slurry composition 22 will be much faster at some points than in others. Accordingly, the flow rate of the non-abrasive liquid 36 will in some cases be less than the flow rate of the slurry composition 22 and will in some cases be equal to or greater than the flow rate of slurry composition 22. The ability to maintain a continuous film layer 42 around the entire inner surface 40 of transport system 10 to prevent contact of the solid particles 24 of the slurry composition 22 with the inner surface 40 of transport system 10, is critical to the present invention; therefore, control means for controlling the flow rate of the non-abrasive liquid 36 is also critical.

Figure 5:
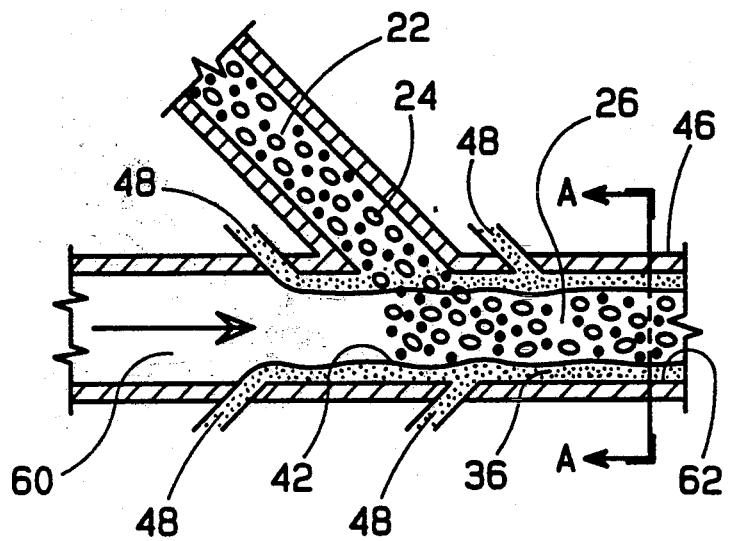
FIG. 5 is a vertical longitudinal sectional view of an atomizer spray nozzle.

As illustrated in FIGS. 2 and 3, a plurality of inlets 48 may be used for the injection of non-abrasive liquid 36 into the transport system 10 rather than an annulus 16. The direction of flow of the slurry composition 22 and the non-abrasive liquid 36 is illustrated by the arrows. In the preferred embodiment, inlets 48 would be circularly arranged around transport system 10 and at various distances therealong such that a film layer 42 of non-abrasive liquid 36 maintains intimate contact with the entire inner surface 40 of transport system 10. FIGS. 2, 3 and 5 illustrate the use of numerous inlets for the injection of the non-abrasive liquid 36. However the annulus 16 (illustrated in FIG. 1) could also be used in substitution of the inlets 48 shown therein. It is further recognized that there may be other methods for injecting non-abrasive liquid 36 into a transport system 10 and that annulus 16 and inlets 48 are only representative thereof and the methods of the present invention are not limited thereto.

Figure 4:
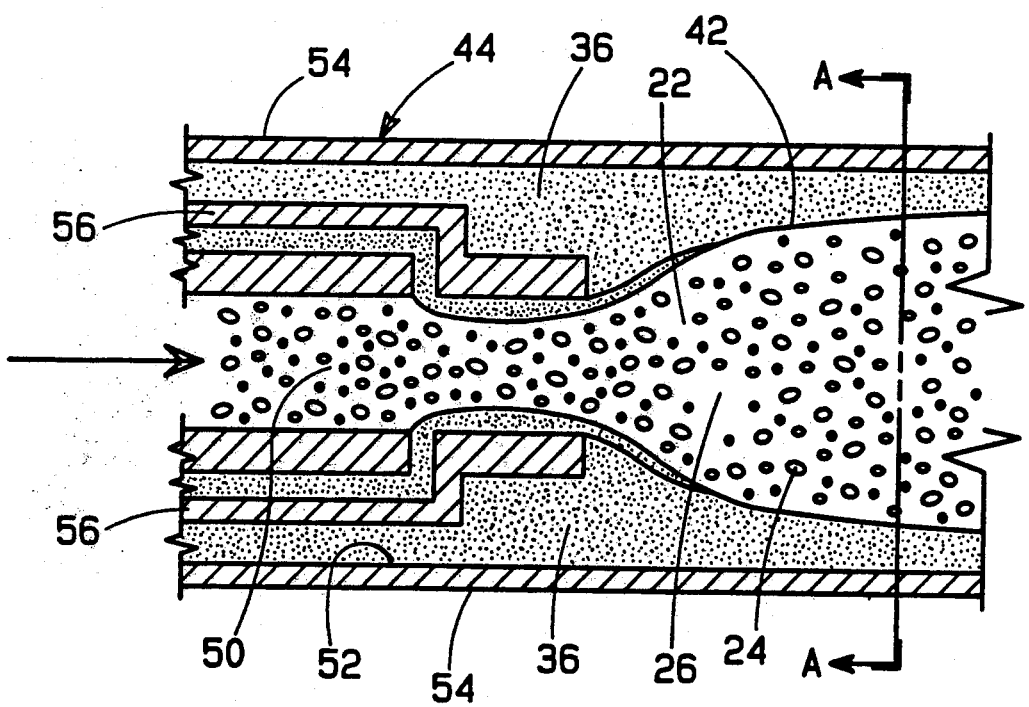
FIG. 4 is a vertical longitudinal sectional view of a slurry jet pump.

FIG. 4 illustrates the method of the present invention as applied to a slurry jet pump. The slurry composition 22 is injected through the center 50 of jet pump 44 and non-abrasive liquid 36 is injected in two stages along the inner surface 52 of outer wall 54 and intermediate wall 56 of slurry jet pump 44. The arrow shown in FIG. 4 illustrates the direction of flow of slurry composition 22 and non-abrasive liquid 36 through slurry jet pump 44. Scouring erosion is prevented or mitigated as the non-abrasive liquid 36 again forms a film layer 42 which serves as a barrier between slurry composition 22 and the inner surface of the pump 52. In an alternative embodiment, intermediate wall 56 of the slurry jet pump 44 may be removed such that the non-abrasive liquid 36 is injected in a single stage and having a similar effect.

FIG. 5 illustrates the method of the present invention as applied to an atomizing spray nozzle 46. In such an apparatus, the slurry composition 22 combines and mixes with an atomizing fluid 60, which usually is comprised of air. Since high impact erosion occurs at the point of mixing of the slurry composition 22 with the atomizing fluid 60, a critical amount of non-abrasive liquid 36 is injected at this point. The arrow shown in FIG. 5 illustrates the direction of flow of slurry composition 22 and atomizing fluid 60. Multiple inlets 48 are shown at the point of mixing. However an annulus 16 as illustrated in FIG. 1 could also be employed at this location. Again, it is critical that the flow rate of non-abrasive liquid 36 which is injected into atomizing spray nozzle 46 be controlled in order to maintain a continuous film layer 42 around the entire inner surface 62 of atomizing spray nozzle 46.

Figure 6:
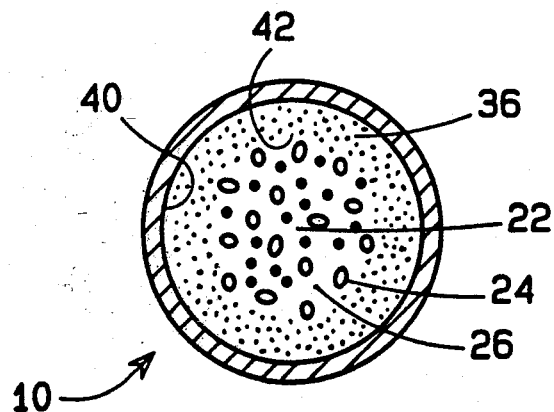
FIG. 6 is a cross-sectional view taken along line A—A of FIG. 1.

FIG. 6 illustrates a cross-sectional view taken through line A—A of FIG. 1. This view clearly illustrates the slurry composition 22 flowing through the center of straight section 12 of transport system 10 separated from the entire inner surface 40 of transport system 10 by the film layer 42 of non-abrasive liquid 36. FIG. 6 is also representative of cross-sectional views taken through lines A—A of FIGS. 2, 3, 4 and 5. In all such illustrations, a film layer 42 of non-abrasive liquid 36 maintains intimate contact with the entire inner surface 40 of transport system 10 in order to prevent contact of slurry composition 22 with the inner surface 40 of transport system 10 thereby preventing the erosion or scouring thereof.

The foregoing description and drawings merely explain and illustrate the invention, and the invention is not limited thereto except insofar as those who have the disclosure before them are able to make modification and variations therein without departing from the scope of the invention.

The embodiment of the invention in which an exclusive property or privilege is claimed is defined as follows:

1. An apparatus for conveying a slurry composition, said apparatus comprising:
   elongate duct means comprising straight and bent portions for directing a continuous flow of said slurry composition in a flow direction, said elongate duct means having inlet means for introducing said slurry composition into said elongate duct means;
   nozzle means for injecting an atomizing fluid into said slurry composition within said elongate duct means to mix with and atomize said slurry composition; and
   means for reducing erosion of said elongate duct means by said slurry composition comprising means for injecting a continuous annular stream of non-abrasive fluid into said elongate duct means in the direction of said flow and at the point of mixing of said slurry composition and said atomizing fluid, wherein said continuous annular stream of non-abrasive fluid maintains intimate contact with the entire inner surface of said elongate duct means, thereby creating a fluid barrier between said slurry composition and said inner surface of said elongate duct means.

2. The apparatus of claim 1, wherein said means for injecting a continuous annular stream of non-abrasive fluid comprises a sleeved annulus fixedly attached to said elongate duct means.

3. The apparatus of claim 1, wherein said means for injecting a continuous annular stream of non-abrasive fluid comprises a plurality of inlets positioned circumferentially around said elongate duct means serially at various distances therealong whereby said direction of flow of said slurry composition is unaffected by said injection of said continuous annular stream of non-abrasive fluid into said elongate duct means.

4. The apparatus of claim 1, wherein said apparatus further comprises control means for adjusting the rate at which said stream of non-abrasive fluid is injected into said elongate duct means in responsive to the physical properties of said slurry composition.

5. A method of reducing erosion in a conveying apparatus having an inner surface, said method comprising the steps of:
   injecting a constant flow of liquid to be conveyed into said conveying apparatus;
   injecting a constant flow of non-abrasive fluid into said conveying apparatus in the direction of the flow of said liquid, wherein said fluid maintains intimate contact with the entire inner surface of said conveying apparatus, said entire inner surface thereby creating a fluid barrier between said liquid and said inner surface of said conveying apparatus; said non-abrasive fluid thereby minimizing erosion of said conveying apparatus by preventing contact of said liquid with said inner surface of said coinveying apparatus;
   and further comprising injecting air as an atomizing fluid into an atomizing nozzle wherein said air mixes and combines with said fluid.

6. A method of reducing erosion in a slurry conveying apparatus having an inner surface, said method comprising the steps of:
   introducing a constant flow of slurry into said slurry conveying apparatus;
   injecting a continuous annular stream of nonabrasive fluid into said conveying apparatus in the direction of flow of said slurry, wherein said fluid maintains intimate contact with the entire inner surface of said conveying apparatus;

adjusting the flow rate of said annular stream of non-abrasive fluid in order to control the thickness thereof in response to the physical properties of said slurry, thereby creating a fluid barrier between said slurry and said inner surface of said conveying apparatus;

said annular stream of non-abrasive fluid minimizing erosion of said conveying apparatus by preventing contact of said slurry with said inner surface of said conveying apparatus;

wherein said slurry conveying apparatus comprises an atomizing nozzle;

wherein said slurry is comprised of a first fluid portion and a second particulate portion and wherein said first fluid portion is of the same composition as said non-abrasive fluid and further comprising supplying said atomizing nozzle with atomizing fluid and injecting said atomizing fluid into said slurry.

7. A method of reducing erosion in a slurry conveying apparatus having an inner surface, said method comprising the steps of:

introducing a constant flow of slurry into said slurry conveying apparatus;

injecting a continuous annular stream of nonabrasive fluid into said conveying apparatus in the direction of flow of said slurry, wherein said fluid maintains intimate contact with the entire inner surface of said conveying apparatus;

adjusting the flow rate of said annular stream of non-abrasive fluid in order to control the thickness thereof in response to the physical properties of said slurry, thereby creating a fluid barrier between said slurry and said inner surface of said conveying apparatus;

said annular stream of non-abrasive fluid minimizing erosion of said conveying apparatus by preventing contact of said slurry with said inner surface of said conveying apparatus;

wherein said slurry conveying apparatus comprises an atomizing nozzle;

and further comprising injecting air as an atomizing fluid into said atomizing nozzle wherein said air mixes and combines with said slurry.

8. The method of claim 7, wherein said slurry conveying apparatus comprises sections of straight and bent tubing.

9. The method of claim 7, wherein said flow rate of said annular stream of non-abrasive fluid is equal to said constant flow of said slurry.

10. The method of claim 7, wherein said slurry is comprised of a first fluid portion and a second particulate portion and wherein said first fluid portion is of the same composition as said non-abrasive fluid.

* * * * *